United States Patent [19]

Balogh, Jr. et al.

[11] 3,735,355

[45] May 22, 1973

[54] DIGITAL PROCESSOR HAVING VARIABLE LENGTH ADDRESSING

[75] Inventors: Edward Balogh, Jr., Diamond Bar; Darwen J. Cook, Monroviar, both of Calif.

[73] Assignee: Burroughs Corporation, Detroit, Mich.

[22] Filed: May 12, 1971

[21] Appl. No.: 142,446

[52] U.S. Cl. ....................340/172.5

[51] Int. Cl. ....................G06f 9/20

[58] Field of Search ....................340/172.5

[56] References Cited

UNITED STATES PATENTS

| | | | |
|---|---|---|---|
| 3,470,537 | 9/1969 | Goshorn et al. | 340/172.5 |
| 3,422,405 | 1/1969 | Packard et al | 340/172.5 |
| 3,331,056 | 7/1967 | Lethin et al. | 340/172.5 |
| 3,400,380 | 9/1968 | Packard et al | 340/172.5 |
| 3,408,630 | 10/1968 | Packard et al | 340/172.5 |
| 3,483,526 | 12/1969 | Couleur | 340/172.5 |

*Primary Examiner*—Paul J. Henon
*Assistant Examiner*—John P. Vandenburg
*Attorney*—Christie, Parker & Hale

[57] ABSTRACT

A data processor in which the address fields within the instructions may be of two different lengths in terms of the number of address digits in the field. The number of digits in the address field is determined by the digit in the most significant digit position of the address. If the most significant digit is coded to be a special character, the next six digits are used as the address. If the most significant digit is not coded to be the special character but a decimal digit, it is used together with the next four digits as the address.

10 Claims, 4 Drawing Figures

INVENTOR.
EDWARD BALOGH, JR.
DARWEN J. COOK
BY
Christie, Parker & Hale
ATTORNEYS

DIGITAL PROCESSOR HAVING VARIABLE LENGTH ADDRESSING

FIELD OF THE INVENTION

This invention relates to electronic digital data processors, and more particularly, is concerned with a control for fetching from memory instructions having variable length address fields.

Conventional digital data processing systems are programmed from a list of instructions which are unique to the particular processing system. Each instruction is coded to indicate a particular operation, such as an add, a subtract, or a number of other arithmetic, logical, or relational operations, and usually includes one or more addresses where operands and results involved in the execution of the instruction are or may be stored in memory. The number of coded bits required to specify such an address is dependent in part on the maximum capacity of the addressable storage or memory associated with the data processing system. For example, in order to address a memory having 100,000 addressable cells requires an address field of five decimal digits in order to specify all possible locations in memory.

Because customer requirements differ substantially, it is desirable to design digital data processing systems in modular form so that the system capacity is made as flexible as possible. Thus it is desirable to provide a modular memory which permits the size of the memory to be modified according to the requirements of a particular system installation.

In most prior art machines, the address fields of an instruction are of fixed length, that is, each address in the instruction has a predetermined number of bits, digits, or characters to specify a single address location in memory. The length of the address field is whatever is required to accommodate the maximum memory capacity of the machine. If smaller memory capacity is provided in a given installation, one or more bits, digits, or characters in the address may be wasted.

Attempts have been made in the past to extend the addressing ability of a computer by various techniques. However, known methods of extending the address require additional coding within the instruction or require that the address field be augmented by additional address information which is stored separately from the instruction. An example of one such prior art arrangement is described in U.S. Pat. No. 3,331,056 in which an address field may be either two characters or three characters in length depending upon the setting of a control flip-flop. The flip-flop, however, must be set or reset in accordance with a separate program instruction that defines which of the two address conditions is to be in effect.

SUMMARY OF THE INVENTION

The present invention provides an improved arrangement for extending an instruction address which allows the address itself to contain sufficient information to specify its own length. No additional coding within the instruction is required and no control registers or flip-flops must be preset in order to implement the address extension.

In brief, the present invention provides a character oriented data processing system having variable length instructions in which binary coded decimal digits may be arranged according to different predetermined formats including none, one, or three address fields. The instructions are stored in an addressable memory, the instruction digits being read out sequentially during the fetching of the instruction from memory. The most significant digit of each address field normally is any one of the binary coded decimal digits 0 through 9. If the most significant digit is a 0 through 9, it is placed together with the next four digits from memory in an address storage register to provide a five-digit address. However, if the most significant digit of the address field is a binary coded 12 (1100), which is a forbidden combination in a binary coded decimal machine, it is discarded and the next six digits read out of memory are placed in the address storage register. Thus without increasing the amount of code in the instruction, the programmer can provide information about the length of the address, so that during the normal fetch cycle additional digits of address are automatically fetched from the address field in memory to complete the extended address.

BRIEF DESCRIPTION OF THE DRAWINGS

For a more complete understanding of the invention, reference should be made to the accompanying drawings wherein.

DETAILED DESCRIPTION

Figure 1A:
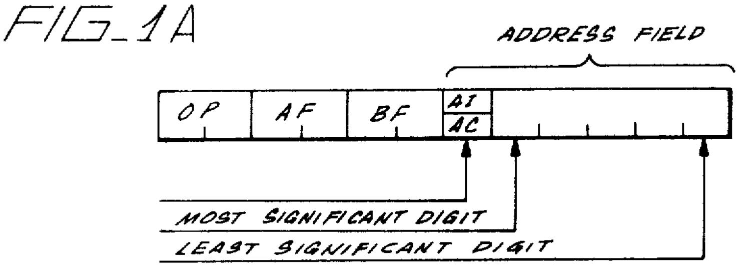
FIG. 1A depicts the format of a single address instruction with an unextended address field.

Referring to FIG. 1A, there is shown the format of a typical instruction having one address. For a more detailed description of the data processing system which utilizes instructions of the type shown in FIG. 1A, see U.S. Pat. No. 3,408,630 assigned to the same assignee as the present application. Specifically, the normal single address instruction comprises 12 binary coded decimal digits. The first two digits denote a particular operation and are referred to as the OP code digits. These two digits are coded to specify the type of instruction, namely, whether it is a no-address, one-address, or three-address instruction, for example, and what operation is to be performed, such as an Add, Multiply, Store, Branch, or other well known conventional computer operation. The next four digits are variant digits and form no part of the operation of the present invention. The variant digits provide a means of modifying particular operations or provide an indication of the number of digits in the operand fields being addressed by the instruction, or the like.

The next six digits represent the address field for an unextended address. The first or highest order digit in the address field is for control purposes. This control digit is arranged such that two of the four bits of this control digit, designated AI, denote whether indexing is to be used and, if so, which of several index registers is to be used. The remaining two bits of this control digit, designated AC, are used to denote whether indirect addressing is to occur and may be used for other control purposes which form no part of the present invention. The next five bits of the address field represent a base relative address. By providing five digits of address it is possible to address up to 100,000 address locations in memory.

Figure 1B:
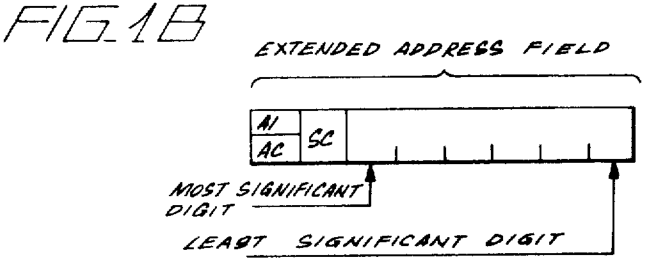
FIG. 1B depicts the format of an instruction address field having an extended address.

Referring to FIG. 1B, there is shown the format for the address field of an extended address. Again the highest order digit position is a control digit which is split into the AI bits and the AC bits for controlling indexing and indirect addressing. The next highest order digit in the memory field is a special character SC, for example, a binary coded decimal 12 (1100). In a binary coded decimal system there are four binary bits per digit, thus allowing up to 16 different possible binary bit combinations. However only ten of these bit combinations are used for coding the decimal digits 0 through 9. The remaining combinations are not used in a decimal system, and therefore are often referred to as "forbidden combinations". The special character utilizes one of these forbidden combinations to indicate an extended memory condition.

The address field includes an additional six digits in the extended address form. However, it will be understood that by using other special characters for the second highest order digit of the field, different lengths of fields could be specified if desired. For multiple address instructions there may be additional address fields having either the unextended or the extended form. Each such address field within the instruction includes a control digit in the highest order bit position with the digit in the next highest position being either a binary coded decimal digit, in which case it is used as part of the address, or being a special character, in which case it specifies the number of additional digits comprising the address portion of the address field.

Figure 2:
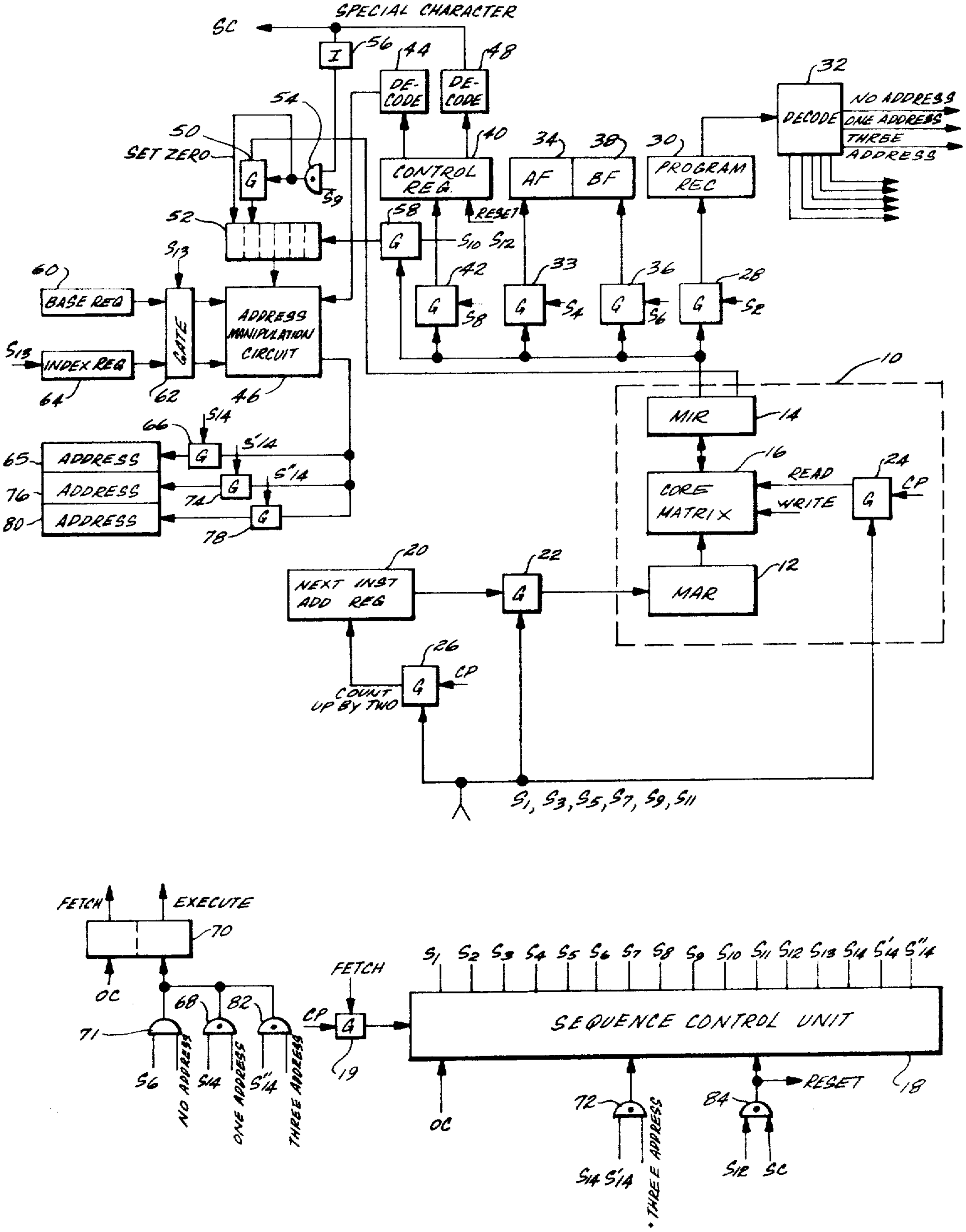
FIG. 2 is a schematic block diagram of one embodiment of the present invention.

Referring to FIG. 2, there is depicted in schematic block form one embodiment of the present invention utilizing instructions having either the unextended or extended form of address fields described above in connection with FIGS. 1A and 1B, respectively. The numeral 10 indicates generally an addressable memory, such as a conventional core memory, which includes a memory address register (MAR) 12 and a memory information register (MIR) 14 associated with a core matrix 16. Normally information is read out of or written into the core matrix 16 from the MIR register 14 two digits at a time from an address location specified by the contents of the MAR register 12. Program instructions of the type depicted in connection with FIGS. 1A and 1B are stored in the core matrix 16 with the digits in sequential address locations.

Operation of the associated processor is initiated by fetching an instruction from the memory 10, and then in response to the instruction, causing the processor to perform a particular operation. The fetch operation is initiated by setting a Fetch/Execute control flip-flop 70 to the Fetch state. The fetch operation by which an instruction is read out of memory 10 is under the control of a Sequence Control 18. The Sequence Control unit, in response to clock pulses CP, advances through a series of control states designated $S_1$ through $S_{14}$.

At the start of the fetch operation, the Sequence Control unit is in the initial states $S_1$. A gate 19, during the fetch operation, couples clock pulses CP to the Sequence Control unit. The starting address of the instruction to be fetched is stored in a Next Instruction Address register (NIA) 20. The NIA register 20 would normally contain a six digit address, for example, for addressing any digit storing location within the core matrix 16. A gate 22 in response to the $S_1$ state of the Sequence Control transfers this address from the register 20 into the MAR register 12 of the memory 10. A gate 24, in response to the $S_1$ state of the Sequence Control unit 18, then causes the next clock pulse CP to initiate a Read operation in which two digits starting at the particular address location are transferred into the MIR register 14. While the memory is addressable as to each digit storage location, the memory is preferably arranged to transfer, for example, two digits into the MIR register 14 during each Read cycle. Thus at the completion of the $S_1$ state of the Sequence Control 18, the two digits comprising the OP field of the instruction are placed in the MIR register 14. A gate 26, in response to the $S_1$ state to the Sequence Control 18, causes the same clock pulse to increment the NIA register 20 by two so as to point to the location in memory of the next two digits of the instruction.

The OP digits in the MIR register 14 are next transferred by a gate 28 in response to the $S_2$ state of the Sequence Control unit 18 into a Program register 30. Thus the OP code is placed in the Program register 30 where it is decoded by a decoding circuit 32. The decoding circuit 32 has a plurality of output control lines which signal the type of operation, and also signal whether the instruction is a no-address, a one-address, or three-address type of instruction, for example.

The Sequence Control unit 18 then advances to the $S_3$ state during which the contents of the NIA register 20 are again transferred through the gate 22 to the MAR register 12 and another Read cycle takes place in the memory by which the first two variant digits of the instruction are placed in the MIR register 14. With the Sequence Control unit 18 in the $S_4$ state, these digits are transferred by a gate 33 to an AF register 34 which stores the first two variant digits of the instruction.

With the Sequence Control unit 18 advanced to the $S_5$ state, the incremented contents of the NIA register 20 are again coupled by the gate 22 to the MAR register 12 and another Read cycle is initiated. This causes the next two variant digits of the instruction to be placed in the MIR register 14. During the $S_6$ state, these two variant digits are transferred by a gate 36 to a BF register 38 where they are stored for use during the later execution of the instruction. It should be noted that both at the end of the $S_3$ state and the $S_5$ state, the NIA register 20 is advanced by two to provide the sequential addressing of pairs of digits of the instruction stored in the memory 10. If the decoder 32 signals a NO-ADDRESS instruction, the Fetch/Execute flop 70 is set to the Execute state by the output of an AND circuit 71 which senses the NO-ADDRESS signal from the decoder 32 and the $S_6$ state of the control unit 18.

Assuming the instruction has at least one address, the Sequence Control 18 advances to the $S_7$ state. The MAR register 12 is again set from the NIA register 20 through the gate 22 and another Read cycle is initiated. As the result, the two most significant digits of the address field of the instruction are placed in the MIR register 14. During the $S_8$ state of the Sequence Control 18, these two digits are transferred to a Controller register 40 through a gate 42. The highest order digit in the Controller register 40 is the control digit (AI/AC) of the address field, which is decoded by a decoding circuit 44 and applied to an address manipulation circuit 46. The second highest order digit, which is the highest order digit of the address in the unextended address form and is the special character in the extended address form, is applied to a decoder 48. If the digit is a special character, it is recognized by the decoding circuit 48 which provides an output signal on a line designated SC.

With the Sequence Control 18 advancing to the $S_9$ state, the next to the highest order digit of the address field is applied through a gate 50 to the next to the highest order digit position of a six-digit register 52. The gate 50 is controlled by the output of an AND circuit 54 to which the $S_9$ state of the Sequence Control 18 is applied and to which the special character signal SC is applied through an inverter 56. Thus only in the event the digit is not a special character, indicating an unextended address, is it stored in the register 52. At the same time, the output of the AND circuit 54 sets the most significant digit position of the register 52 to 0. Also during the $S_9$ state of the Sequence Control 18, the contents of the NIA register 20 are transferred by the gate 22 to the MAR register 12 and a Read operation is initiated. Thus at the end of the $S_9$ state, the next two digits of the instruction address field are placed in the MIR register 14.

With the Sequence Control 18 advancing to the $S_{10}$ state, these two digits are transferred from the MIR register 14 by a gate 58 to the register 52. The Sequence Control 18 then advances to the $S_{11}$ state in which the contents of the NIA register 20 are again coupled into the MAR register 12 and a Read operation is initiated, placing the next two digits of the instruction in the MIR register 14. During the $S_{12}$ state of the Sequence Control 18 these next two digits are transferred into the register 52. Assuming the special character was not present, at this stage of operation the register 52 contains five digits of address plus a 0 in the most significant digit position. This address is applied to the address manipulation circuit 46 together with the decoded control signals from the control digit stored in the controller register 40. The Sequence Control 18 advances then to the $S_{13}$ state.

As described in more detail in the above-identified U.S. Pat. 3,408,630, during the $S_{13}$ state various manipulations may be performed upon the relative address in the register 52. One manipulation which always is performed upon the relative address is the addition to it of digits stored in a Base Address register 60. The register 60 contains preferably three digits and these digits are added to the three most significant digits in the register 52 by the address manipulation circuit 46 during the $S_{13}$ state. To this end the $S_{13}$ state is applied to a gating circuit 62 which gates the contents of the base register 60 to the address manipulation circuit 46. If the control digit in the control register 40 indicates that indexing is to take place, an Index register 64 has its contents gated by the gating circuit 62 to the address manipulation circuit 46. The address manipulation circuit adds the contents of the Base register and the Index register to the relative address in the register 52. Thus the address manipulation circuit generates an output which is an absolute address that points to the location in memory where the desired operand begins. This address is placed in an address storage register 65 through a gate 66 when the Sequence Control 18 advances to the $S_{14}$ state.

If the instruction is a one-address instruction as indicated by the output of the decoding circuit 32, an AND circuit 68 sets the Fetch/Execute flip-flop 70 from the Fetch state to the Execute state, thereby placing the processor in the mode to execute the instruction and completing the fetch operation. On the other hand, if the instruction has a three-address instruction, as indicated by the output of the decoder 32, the output of an AND circuit 72, which senses the $S_{14}$ state and the three-address signal from the output of the decoder 32, sets the Sequence Control back to the $S_7$ state, causing the next address field in the instruction to be read out of memory and stored in the manner described in detail above. Thus the Sequence Control 18 advances from the $S_7$ state through the $S_{13}$ state. However, for the second address, the Sequence Control goes into an $S'_{14}$ state which activates a gate 74 for placing the second address in a second address register 76.

Again the Sequence Control is reset to the $S_7$ state by the output of the AND circuit 72 so that the third-address can be read out of memory. After advancing through the $S_{13}$ state, the Sequence Control enters the $S''_{14}$ state in which the third address is gated by a gate 78 to a third address storage register 80 from the address manipulation circuit 46. In this way, all three addresses of the three-address instruction are stored during the fetch operation. When the Sequence Control 18 reaches the $S''_{14}$ state, it also causes the output of an AND circuit 82 to set the Fetch/Execute flip-flop 70 to the Execute state.

The description thus far describes the fetching of instructions which have non-extended address fields. The operation is modified by the Sequence Control 18 in the following manner when manipulating and storing an extended address. After the first two digits of the address field are read out into the controller register 40 during the $S_7$ and $S_8$ states of the Sequence Control 18, in the case of the extended address field, the decoder 48 senses the presence of the special character in the next to the most significant digit location. As a result, during the $S_9$ state, this character is not gated into the register 52 since the output of the AND circuit 54 will not be true. Likewise no zero will be set in the most significant digit position of the register 52. The next two digits of the address field of the instruction in memory are transferred during the $S_9$ state and $S_{10}$ state of the Sequence Control 18 into the register 52. In the case of the extended address field, these next two digits become the two most significant address digits in the register 52.

During the $S_{11}$ state and the $S_{12}$ state of the Sequence Control 18, the next two digits of the address field are transferred from memory into the register 52. There are now four digits of the six-digit address present in the register 52. To transfer the remaining two digits of the six-digit address into the register 52, the Sequence Control is reset to the $S_{11}$ state by the output of an AND circuit 84 which senses when the Sequence Control is in the $S_{12}$ state and when the special character, indicated by the signal on the line SC from the decoder 48, is present. The output of the AND circuit 84 is also used to reset the special character portion of the controller register 40 to 0, thereby turning off the SC line signal from the decoder 48. As a result, the Sequence Control 18 again enters the $S_{11}$ state and the $S_{12}$ state during which the next two digits of the address field are transferred to the register 52. As a result all six digits of the extended address field are now present in the register 52 as a relative address.

The Sequence Control 18 now advances to the $S_{13}$ state during which the relative address is changed to an absolute address by adding the contents of the Base register 60 to the most significant digit positions and indexing may be done by the address manipulation circuit 46 if called for. The address is then stored in the address storage register 65 through the gate 66 during the $S_{14}$ state of the Sequence Control 18.

Figure 3:
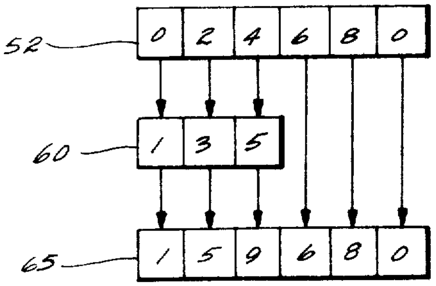
FIG. 3 is a schematic block diagram showing how the base relative addressing is provided within the arrangement of FIG. 2.

FIG. 3 illustrates the manner in which the relative address is converted into an absolute address by the contents of the Base Address register 60 in the address manipulation circuit 46. As described above, the relative address placed in the register 52 may be either a five-digit unextended form of address or may be a six-digit extended form of address. There is shown in FIG. 3 by way of an example, an unextended address having a zero in the most significant digit position of the register 52. In the example shown, the relative address is 024680. The Base Address register 60 is shown as having the digits 135. The absolute address is the result of adding the contents of the register 60 to the three most significant digit positions of the register 52, resulting in an absolute address 159680 in the address storage register 65. In the case of an extended address, the same relative addressing technique is followed, only the digit in the most significant digit position of the register 52 may be some digit value other than zero.

From the above description it will be recognized that an arrangement is provided b which the relative address of an instruction can be extended from five digits to six digits merely by setting the next to the most significant digit of the address field to the binary coded equivalent of 12, a forbidden combination in a binary coded decimal system. No additional code must be added to the instruction and no control circuit must be preset by a prior instruction.

What is claimed is:

1. In a character oriented data processing system having variable length stored instructions in which binary-coded decimal digits may be arranged according to different predetermined formats, particular instruction formats having at least one address field, the address field being of at least two different possible numbers of digits in length, apparatus comprising an addressable memory for storing said instructions, means for reading out the digits of an instruction sequentially, address storing means, means responsive to a preselected digit in an address field of the instruction after the digit is read out of memory and the digit has a predetermined value for transferring a first predetermined number of address digits from memory to the address storing means, and means responsive to said preselected digit when it is not said predetermined value for transferring a second predetermined number of address digits from memory to the address storing means.

2. Apparatus as defined in claim 1 wherein the second predetermined number of address digits transferred to memory is smaller than said first predetermined number of digits.

3. Apparatus as defined in claim 1 wherein said means for transferring the second predetermined number of address digits includes means for transferring said preselected digit as one of the address digits to the address storing means.

4. Apparatus as defined in claim 3 wherein said last named means stores said preselected digit as the most significant digit of the group of address digits stored in the address storage means.

5. In a data processing system in which instructions are stored in an addressable memory, the instructions having a first group of digits coded to indicate the required operation to be executed by the precessing system and having at least one additional group of digits specifying a relative address of data locations in memory, apparatus for fetching an instruction from memory comprising control means for reading the digits of a particular instruction out of the memory in sequence starting with its said first group of digits, said control means including means responsive to the first group of digits for reading out the digits of one or more additional groups of digits of the instruction in sequence, address storage addresses, for storing a plurality of address, means responsive to a predetermined one of the digits of each of said additional groups of digits after it is read out of memory for controlling the number of digits in each of said additional group of digits read out of memory, and means transferring said additional groups of digits to said address storage means.

6. The apparatus of claim 5 wherein said means responsive to a predetermined one of the digits includes means sensing when said predetermined digit has a unique coded value, means responsive to said sensing means for storing said digit in the address storage means as part of said group of digits stored as an address only when the sensing means determines the digit is not said unique coded value.

7. An addressable memory for storing binary-coded decimal digits representing variable length instructions and data, fetch control means for reading out the digits of an instruction stored in memory in sequence starting at a particular address in memory, a first register, the fetch control means including means diverting a first group of digits of the instruction into the first register, a second register, means responsive to particular digits stored in the first register for causing the fetch control means to read out at least one group of address digits into the second register, means for sensing if a predetermined one of said address digits transferred from memory to the second register is a predetermined coded value, means controlled by said sensing means when the predetermined digit has said coded value for reading out of memory and storing a first number of said address digits in the second register, and means controlled by said sensing means when the predetermined digit is not said coded value for reading out and storing a second number of said address digits in the second register.

8. Apparatus as defined in claim 7 wherein said predetermined coded value of the highest order digit of a group of address digits is a binary-coded decimal number greater than the decimal digit nine.

9. Apparatus as defined in claim 7 wherein said means for storing the second number of address digits stores said highest order digit with the group of address digits in the second register, and said means for storing the first number of address digits excludes said highest order digit from the group of address digits in the second register.

10. Apparatus as defined in claim 7 further including address storage means, and means for transferring the address digits from the second register to the address storage means.

* * * * *